United States Patent [19]

Ribbans

[11] Patent Number: 5,296,287

[45] Date of Patent: Mar. 22, 1994

[54] SINGLE MEMBRANE INSULATION MATERIAL

[75] Inventor: Robert C. Ribbans, Amherst, N.H.

[73] Assignee: Textiles Coated Incorporated, Amherst, N.H.

[21] Appl. No.: 981,198

[22] Filed: Nov. 25, 1992

[51] Int. Cl.⁵ ............................................... B32B 7/00
[52] U.S. Cl. .................................. 428/251; 428/246; 428/421; 428/422; 428/920
[58] Field of Search ............... 428/246, 251, 421, 422, 428/920

[56] References Cited

U.S. PATENT DOCUMENTS

| | | |
|---|---|---|
| 2,833,686 | 5/1958 | Sandt. |
| 3,086,071 | 4/1963 | Preston ................................ 174/117 |
| 3,159,609 | 12/1964 | Harris et al. ........................ 260/87.5 |
| 3,446,686 | 5/1969 | Butler et al. ......................... 156/224 |
| 3,513,064 | 5/1970 | Westley ................................. 161/92 |
| 3,547,765 | 12/1970 | Snyder et al. ........................ 161/189 |
| 3,579,370 | 5/1971 | Punderson et al. .................... 117/72 |
| 3,623,903 | 11/1971 | Dislich .............................. 427/385.5 |
| 3,899,622 | 8/1975 | Geiger ................................. 428/245 |
| 3,928,703 | 12/1975 | Cook ................................... 428/255 |
| 4,013,812 | 3/1977 | Geiger ................................. 428/245 |
| 4,090,726 | 5/1978 | Mischel ................................ 285/229 |
| 4,104,095 | 8/1978 | Shaw .................................... 156/83 |
| 4,165,404 | 8/1979 | Quehl .................................. 428/212 |
| 4,168,298 | 9/1979 | Fitzgerald ............................ 428/224 |
| 4,194,041 | 3/1980 | Gore et al. ........................... 418/315 |
| 4,272,851 | 6/1981 | Goldstein .................................. 2/79 |
| 4,327,893 | 5/1982 | Bachmann et al. .................. 251/159 |
| 4,347,268 | 8/1982 | Close ................................ 427/385.5 |
| 4,399,183 | 8/1983 | Withers ............................... 428/247 |
| 4,421,878 | 12/1983 | Close .................................. 523/454 |
| 4,423,183 | 12/1983 | Close .................................. 524/546 |
| 4,443,511 | 4/1984 | Worden et al. ...................... 428/198 |
| 4,452,848 | 6/1984 | Geiger ................................. 428/247 |
| 4,487,878 | 12/1984 | Vasta .................................. 524/413 |
| 4,490,501 | 12/1984 | Vasta .................................. 524/413 |
| 4,493,311 | 1/1985 | Bachmann ....................... 126/285 A |
| 4,493,342 | 1/1985 | Bachmann ........................... 137/601 |
| 4,495,247 | 1/1985 | Vasta .................................. 428/422 |
| 4,495,248 | 1/1985 | Vasta .................................. 418/422 |
| 4,506,054 | 3/1985 | Vasta .................................. 524/413 |
| 4,511,162 | 4/1985 | Broyles ................................. 285/49 |
| 4,555,543 | 11/1985 | Effenberger et al. ................ 524/520 |
| 4,582,296 | 4/1986 | Bachmann ........................... 251/326 |
| 4,610,918 | 9/1986 | Effenberger et al. ................ 428/245 |
| 4,654,235 | 3/1987 | Effenberger et al. ............. 427/407.3 |
| 4,732,413 | 3/1988 | Bachmann et al. ..................... 285/49 |
| 4,749,168 | 6/1988 | Maxwell et al. ..................... 251/174 |
| 4,770,927 | 9/1988 | Effenberger et al. ................ 428/245 |
| 4,883,716 | 11/1989 | Effenberger et al. ................ 428/421 |
| 4,886,699 | 12/1989 | Carroll et al. ....................... 428/220 |
| 4,943,473 | 7/1990 | Sahatjian et al. .................... 428/245 |

OTHER PUBLICATIONS

Goldman, Edward J., Robert A. Rosenberg and Warren E. Lee, "How to Use Fluorocarbon Plastics as Bonding Agents", *Adhesives Age*, Feb. 1967, pp. 30-34.

*Primary Examiner*—James J. Bell
*Attorney, Agent, or Firm*—Samuels, Gauthier & Stevens

[57] ABSTRACT

A single membrane insulation material comprising a flexible fluoropolymer coated substrate, an insulating material laminated to one side of said substrate, and an anti-porosity fluid barrier associated with said substrate and shielded by said insulating material from elevated temperatures at said one side. Also disclosed is the inclusion of a a melt bondable fluoropolymer adhesive layer between the flexible fluoropolymer coated substrate and the insulating material.

8 Claims, 1 Drawing Sheet

SINGLE MEMBRANE INSULATION MATERIAL

BACKGROUND OF THE INVENTION

1. Field of the Invention

This invention relates generally to flexible expansion joint materials for use in industrial flue ducts and other like applications, and is concerned in particular with an improved single membrane expansion joint material capable of withstanding elevated temperatures on the order of 500–1000° F. and higher.

2. Description of the Prior Act

Flexible expansion joints permit interconnected sections of large flue ducts to undergo relative shifting in response to thermal changes. This is particularly important where normal operating temperatures range from 600–800° F.

Fluoroplastic/fiberglass composites adequately serve as expansion joint materials in operating temperature ranges below about 500° F. Higher temperatures cause thermal deterioration, thereby necessitating additional layers of insulation, usually uncoated fiberglass. The additional insulation layers are bulky, friable, difficult to install, and prone to sag when inverted. Sagging reduces insulating quality and interferes with the flow of gases through the duct.

A primary objective of the present invention is the provision of a single membrane expansion joint material capable of withstanding exposure to high temperature gases without undergoing thermal deterioration.

Companion objectives of the present invention include the provision of an expansion joint material which is relatively compact, easy to handle and install, with an insulation layer which remains intimately bonded to adjacent components of the composite, irrespective of the physical orientation of the material during installation and subsequent use.

SUMMARY OF THE INVENTION

In a preferred embodiment of the invention to be hereafter described in greater detail, an expansion joint material is formed by laminating a layer of porous insulating material to one side of a flexible substrate while simultaneously laminating a fluid barrier in the form of a fluoropolymer film to the opposite side of the substrate. Preferably, the substrate comprises a fiberglass web coated with polytetrafluoroethelene ("PTFE"), the insulating material comprises a web of uncoated fiberglass, and the fluid barrier comprises a film of unsintered PTFE. The insulating material is adhered to the coated substrate by means of an adhesive interlayer which is preferably integrally associated with the substrate as by a surface coating. Preferred adhesive materials include perfluoroalkoxy ("PFA") and fluorinated ethylene propylene ("FEP").

Alternatively, prior to lamination, the adhesive interlayer may exist independently as a film component, and its thickness may if desired be increased sufficiently to additionally serve as a fluid barrier component, thereby obviating the need for a barrier film laminated to the opposite outer surface of the substrate.

DETAILED DESCRIPTION OF THE INVENTION

Figure 1:
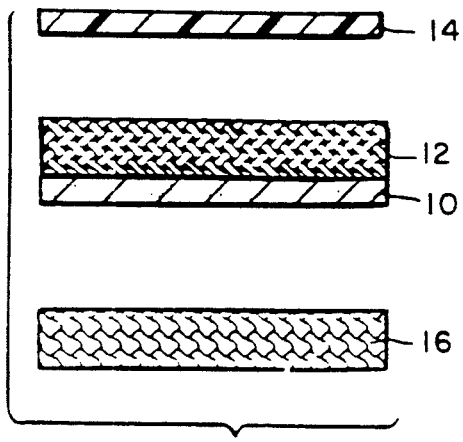
FIG. 1 is an exploded cross-sectional view of a preferred embodiment of an expansion joint material in accordance with the present invention.

With reference initially to FIG. 1, a coating 10 of PFA (Ausimont Hyflon MFA Latex) is applied to one side only of a PTFE coated fiberglass substrate 12 (TCI TEXCOAT 1400). The coating 10 has a weight of 2.5 oz./sq. yd. and is bonded to the substrate 12 to serve as an integral adhesive. The other components include a 4 mil unsintered PTFE tape 14 and a layer of 60 oz./sq. yd. fiberglass fabric 16 (Newtex 2200). The separate components 14, 12/10 and 16 are laminated together at 40 psi and 715° F. for 55 seconds to produce the single membrane composite shown in FIG. 2.

Figure 2:
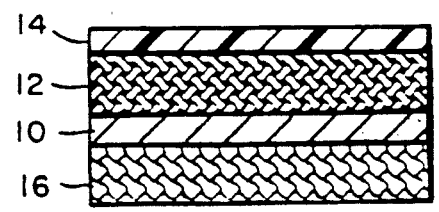
FIG. 2 is a cross-sectional view showing the components of FIG. 1 following lamination under conditions of elevated temperature and pressure.

The insulating value of the resulting composite of FIG. 2 was compared to a conventional composite consisting solely of the PTFE film 14 and PTFE coated fiberglass substrate 12. Samples of each were tested by measuring the temperature of the PTFE film while applying heat to the opposite side of the composite by means of a hot plate in contact therewith. The PTFE film of the conventional composite reached a temperature of 300° F. when the hot plate was heated to 575° F. By contrast, the PTFE film of the composite of FIG. 2 did not reach 300° F. until the temperature of the hot plate had been elevated to 800° F.

The improved insulating capability of the composite of FIG. 2 stems from the interposition of the insulating material 16 and its intimate contact with the PTFE coated substrate 12. Intimate contact is assured by the PFA adhesive interlayer 10. Intimate contact is believed to be critical in that any air space between the insulating material 16 and the coated substrate 12 can give rise to deleterious thermally driven air flow, which occurs in conventional installations as a result of sagging of insulation layers.

The single membrane composite of FIG. 2 is flexible and easily manipulated during installation. The outer PTFE film 14 provides the required fluid barrier properties, and remains fully protected from thermal deterioration by the insulating qualities of the inner insulation layer 16. The coated substrate 12 provides the required tensile strength.

Figure 3:
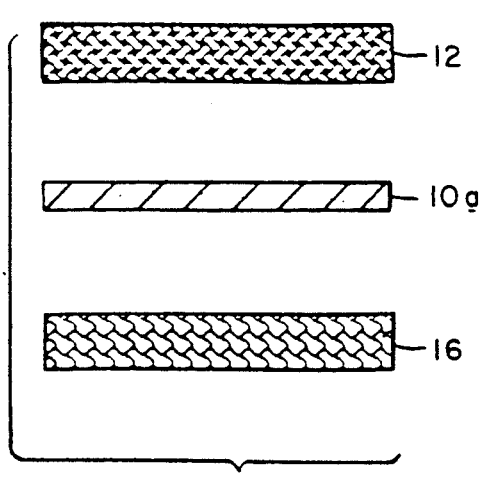
FIGS. 3 and 4 are exploded cross-sectional views of alternate embodiments of the invention.

FIG. 3 illustrates an alternate embodiment wherein the PTFE coated substrate 12 and the fiberglass fabric 16 are laminated by means of a non-integral film 10a of PFA. Here, the film has a thickness on the order of 10 mils, and thereby serves both as an adhesive and as a fluid barrier, thereby obviating the need to apply an external PTFE barrier film.

Figure 4:
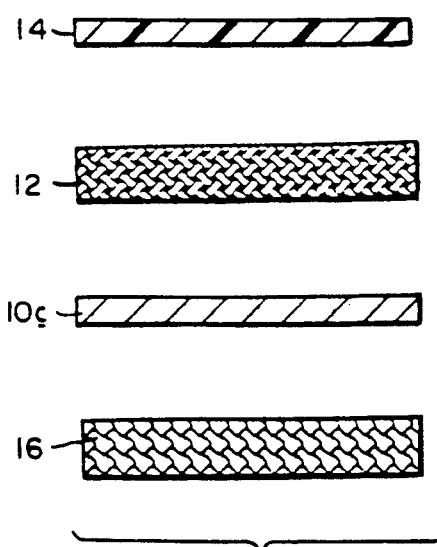

FIG. 4 illustrates still another embodiment of the invention, where the PFA adhesive interlayer consists of a non-integral PFA film 10c having a thickness on the order of 3 mils. The film 10c serves as the adhesive interlayer, but is rendered non-porous during lamination, thereby necessitating the further application of an external PTFE film 14.

I claim:

1. An integrally formed insulating composite comprising:

a flexible fluoropolymer coated substrate; and a non-fluoropolymer insulating layer laminated to one side of said substrate by means of a melt bondable fluoropolymer adhesive interlayer interposed therebetween.

2. The insulating composite of claim 1, wherein said adhesive interlayer is a film serving additionally as a fluid barrier.

3. The insulating composite of claim 1, wherein said adhesive interlayer is a coating, and wherein a PTFE tape is laminated to said coated substrate.

4. The insulating composite of claim 3, wherein said PTFE tape is unsintered before lamination.

5. The insulating composite of claim 1, wherein said flexible fluoropolymer coated substrate includes woven fiberglass coated with polytetrafluoroethylene.

6. The insulating composite of claim 1, wherein said insulating material is woven fiberglass.

7. The insulating composite of claim 1, wherein said melt bondable fluoropolymer adhesive interlayer is perfluoroalkoxy.

8. The insulating composite of claim 1, wherein said melt bondable fluoropolymer adhesive interlayer is fluorinated ethylene propylene.

* * * * *